United States Patent
Mueller et al.

(10) Patent No.: US 6,180,572 B1
(45) Date of Patent: Jan. 30, 2001

(54) AQUEOUS SWELLABLE COMPOSITIONS OF GUAR GUM AND GUAR GUM DERIVATIVES IN OLEOPHILIC LIQUIDS AND THEIR USE

(75) Inventors: Heinz Mueller, Monheim; Claus-Peter Herold, Mettmann; Stephan von Tapavicza, Erkrath, all of (DE)

(73) Assignee: Henkel Kommanditgesellschaft auf Aktien, Duesseldorf (DE)

(*) Notice: Under 35 U.S.C. 154(b), the term of this patent shall be extended for 0 days.

(21) Appl. No.: 09/091,313

(22) PCT Filed: Dec. 6, 1996

(86) PCT No.: PCT/EP96/05456

§ 371 Date: Dec. 28, 1998

§ 102(e) Date: Dec. 28, 1998

(87) PCT Pub. No.: WO97/22676

PCT Pub. Date: Jun. 26, 1997

(30) Foreign Application Priority Data

Dec. 15, 1995 (DE) .............................. 195 46 911

(51) Int. Cl.$^7$ .............................. E21B 21/06; C09K 7/00; C09K 7/04
(52) U.S. Cl. .................. 507/209; 507/112; 507/136; 507/113; 507/138; 507/212; 507/218; 507/261
(58) Field of Search ................... 507/112, 113, 507/136, 138, 209, 212, 218, 261

(56) References Cited

U.S. PATENT DOCUMENTS

| | | | |
|---|---|---|---|
| 4,560,486 | * 12/1985 | Hinkel | 507/103 |
| 4,960,527 | 10/1990 | Penny | 252/8.551 |
| 5,080,171 | * 1/1992 | Wolf et al. | 166/300 |
| 5,106,516 | 4/1992 | Mueller et al. | 507/138 |
| 5,194,422 | 3/1993 | Mueller et al. | 507/136 |
| 5,232,910 | 8/1993 | Mueller et al. | 507/138 |
| 5,252,554 | 10/1993 | Mueller et al. | 507/138 |
| 5,318,954 | 6/1994 | Mueller et al. | 507/138 |
| 5,318,955 | * 6/1994 | Mueller et al. | 507/139 |
| 5,318,956 | 6/1994 | Mueller et al. | 507/139 |
| 5,348,938 | 9/1994 | Mueller et al. | 507/139 |
| 5,403,822 | 4/1995 | Mueller et al. | 507/138 |
| 5,441,927 | 8/1995 | Mueller et al. | 507/138 |
| 5,461,028 | 10/1995 | Mueller et al. | 507/138 |
| 5,576,271 | * 11/1996 | Patel | 507/110 |

FOREIGN PATENT DOCUMENTS

| | | |
|---|---|---|
| 2 057 061 | 11/1990 | (CA) . |
| 2 068 129 | 11/1999 | (CA) . |
| 0 399 270 | 11/1928 | (EP) . |
| 0 374 671 | 6/1990 | (EP) . |
| 0 374 672 | 6/1990 | (EP) . |
| 0 382 071 | 8/1990 | (EP) . |
| 0 386 636 | 9/1990 | (EP) . |
| 0 386 638 | 9/1990 | (EP) . |
| 0 391 251 | 10/1990 | (EP) . |
| 0 391 252 | 10/1990 | (EP) . |
| 0 398 112 | 11/1990 | (EP) . |
| 0 398 113 | 11/1990 | (EP) . |
| 0 505 201 | 9/1992 | (EP) . |
| 0 512 501 | 11/1992 | (EP) . |
| 0 532 570 | 3/1993 | (EP) . |
| 0 627 481 | 6/1993 | (EP) . |
| 91/19771 | 12/1991 | (WO) . |
| 95/15364 | 6/1995 | (WO) . |

OTHER PUBLICATIONS

Davidson, Handbook of Water–soluble Gums and Resins, Chap. 6, 6–1 to 6–19, McGraw Hill (1980).

Applications of Water–Soluble Polymers in the Oil Field, J. of Petroleum Technology, 2042–56 (Nov. 1981).

Society of Petroleum Engineers—SPE 25205, International Symposium on Oilfield Chemistry in New Orleans, LA, Mar. 2–5, 1993, "Cross linked Borate HPG Equilibria and Rheological Characterization".

Society of Petroleum Engineers—SPE 26559, 68th Annual Technical Conference and Exhibition of the Society of Petroleum Engineers, Houston, Texas, Oct. 2–6, 1993, "Fluid Selection for Fracturing High–Permeability Formulations".

Society of Petroleum Engineers—SPE 25490, Product Operations Symposium, Oklahoma City, OK, Mar. 21–23, 1993, "An Improved Method for Measuring Fracturing Gel Break with Resin–Coated Proppant".

* cited by examiner

Primary Examiner—Jill Warden
Assistant Examiner—Latoya I Cross
(74) Attorney, Agent, or Firm—John E. Drach; Glenn E. J. Murphy; Steven J. Trzaska

(57) ABSTRACT

The invention relates to the use of oil-soluble oleophilic organic liquid phases—flowable at temperatures of 0 to 10° C.—from the classes of corresponding monocarboxylic and/or polycarboxylic acid esters, carbonic acid esters, fatty alcohols and their oligoalkoxides and/or ethers as the at least predominant part of the liquid phase in storage-stable homogeneous mixtures with guar and/or water-soluble guar derivatives for their use in water-based borehole servicing fluids.

16 Claims, No Drawings

AQUEOUS SWELLABLE COMPOSITIONS OF GUAR GUM AND GUAR GUM DERIVATIVES IN OLEOPHILIC LIQUIDS AND THEIR USE

This application is 371 of PCT/EP96/05456 filed on Dec. 6, 1996 which claims priority of German application 195 46 911.9, filed on Dec. 15, 1995.

BACKGROUND OF THE INVENTION

In the field of polymeric carbohydrate compounds based on natural materials, guar and its derivatives, such as hydroxyalkyl guar and/or carboxyalkyl guar, are of considerable importance for many industrial applications. The guar-based swelling agents normally used in the form of more or less fine powders are distinguished by their extremely effective thickening when dissolved in aqueous phases. There are reliable methods for controlling the viscosity of correspondingly thickened aqueous treatment solutions using both selected products based on guar or its derivatives and, in particular, suitable crosslinking agents which enable viscosity in the aqueous phase to be additionally controlled through nonionic, anionic and/or cationic mechanisms. The technical questions involved here are discussed in numerous prior art publications, cf. for example Davidson, Handbook of Water-Soluble Gums and Resins, Chapter 6, McGraw-Hill, London (1980).

It is known that the class of useful materials of natural origin in question here is characterized by carbohydrate polymer compounds which are made up at least by far predominantly of mannose and galactose units. The primary hydroxyl group in the $C_6$ position is particularly suitable for derivatization, although secondary hydroxyl groups of the polymer skeleton may also be derivatized. The rheological and other properties of the water-based treatment liquids ultimately required can be controlled very precisely by optional purification of the natural basic material and/or by derivatization in the sense discussed above and optionally by using crosslinking agents.

So far as industrial-scale operation is concerned, difficulties can lie in the early phase of the interaction between the dry guar-based powder and the aqueous phase. An overly rapid interaction between the dry powder and the aqueous phase which is kept in particular at low temperatures results in the formation of solid particles which form gel-like lumps and of which the gel shell prevents further penetration of the aqueous phase into the interior of the lump and is thus a serious obstacle to uniform dissolution and dispersion of the solid material in the aqueous phase. Difficulties of this nature arise in particular when, on an industrial scale, considerable quantities of correspondingly thickened aqueous treatment liquids have to be produced in situ and delivered directly to the point of use. A typical example of this is the use of guar-thickened treatment solutions in the on-shore and/or off-shore development of natural useful materials, such as petroleum, natural gas, water and the like. Aqueous polymer systems are often used in the servicing of boreholes (for example cleaning, periodic stimulation and the like). Polymers capable of establishing high and predetermined viscosities are particularly useful for this purpose. Guar and guar derivatives or mixtures thereof with other auxiliaries, particularly crosslinking agents are prominent in this regard. In chapter 6–10, for example, the literature reference cited above describes the use of correspondingly thickened water-based frac fluids for restoring or increasing the production capacity of corresponding wells. The frac fluid system generally involves the use of so-called proppants (in by far the majority of cases sand), the function of the frac fluids pumped into the borehole from below being on the one hand to penetrate into the area around the well bearing useful material and, on the other hand, to introduce the entrained proppants into the new channels opened up in order further to enhance their effect.

The use of water-soluble polymer compounds in the oilfield is also described in a number of prior art publications, of which the following are cited by way of example: Society of Petroleum Engineers (SPE) of AIME-SPE 9288, 1980 "APPLICATIONS OF WATER-SOLUBLE POLYMERS IN THE OILFIELD"; SPE 25205 (1993) "Crosslinked Borate HPG Equilibria and Rheological Characterization"; SPE 26559 (1993) "Fluid Selection for Fracturing High-Permeability Formations" and SPE 25490 (1993) "An Improved Method for Measuring Fracturing Gel Break with Resin-Coated Proppant". Further particulars of the technical problems involved can be found in these literature references.

For the use of guar or guar derivatives as a thickener and viscosity generator in water-based treatment liquids for servicing boreholes, a particular form of presentation has been developed for the powders based on guar or guar derivatives which meets the various requirements of this particular application particularly well. The guar-based dry powders are mixed with substantially equal quantities of water-insoluble, liquid hydrocarbon compounds to form a high-solids, but flowable or pumpable dispersion. Hitherto, diesel oils or at least substantially dearomaticized hydrocarbon fractions of equally low viscosity have hitherto been used as the organic liquid phase. This pumpable concentrate may be continuously mixed in during introduction of the water-based treatment fluid into the borehole. The guar-based fine-particle useful materials swell after a certain time. This ensures that the fine-particle swelling solid is uniformly incorporated in the entire aqueous phase. The occurrence of undesirably rapid surface swelling and hence interference with swelling through the system are also eliminated.

The teaching according to the invention starts out from this particular preparation of guar and guar derivatives for the production of water-based treatment solutions of controllable viscosity. The problem addressed by the teaching according to the invention was to improve this principle in several respects. Liquid hydrocarbon compounds of the type hitherto used for the purpose in question are potential pollutants with only limited degradability, particularly in the off-shore sector. Quite apart from this, however, technical effects are also in need of improvement. The known highly concentrated mixtures of powder-form guar or corresponding guar derivatives and pure liquid hydrocarbon compounds under discussion here show only limited dispersion stability. After storage for several hours with no movement of the multicomponent mixture, the guar solids sink to the bottom of the storage container with simultaneous phase separation into a predominant solid phase and a supernatant liquid phase. Resulting errors in the metering of predetermined quantities of the solid phase into the water-based servicing fluid endanger the process as a whole. Accordingly, the guar dispersions used hitherto require the use of stabilizers and/or thickeners in the oleophilic liquid phase.

The teaching according to the invention as described hereinafter is based on the discovery that substantial improvements and simplifications in many respects can be achieved by replacing the at least predominant part of the organic hydrocarbon-based liquid phase with selected hydrocarbon oils derivatized with polar groups.

SUMMARY OF THE INVENTION

In a first embodiment, therefore, the present invention relates to the use of oil-soluble oleophilic organic liquid phases—flowable at temperatures of 0 to 10° C.—from the classes of corresponding monocarboxylic and/or polycarboxylic acid esters, carbonic acid esters, ethers, fatty alcohols and their oligoalkoxides and mixtures thereof with one another as the at least predominant part of the liquid phase in storage-stable homogeneous mixtures with guar and/or water-soluble guar derivatives which are present as a preferably fine-particle solid phase. The oleophilic organic liquid phases used in accordance with the invention, as listed above, are additionally characterized by flashpoints of at least 80° C. and viscosities (Brookfield RVT viscosities, as measured at 10° C.) of at most 100 to 150 mPas. The multiphase mixtures of useful materials of the described type are suitable for use in water-based borehole servicing fluids and, by virtue of their content of guar and/or water-water-soluble guar derivatives, lead to adjustable viscosities in the aqueous liquid phase.

In another embodiment, the present invention relates to the multiple-phase mixtures of useful materials of the oleophilic organic liquid phases defined above and the solid fine-particle useful materials based on guar and/or guar derivatives incorporated therein.

DETAILED DESCRIPTION OF THE INVENTION

The teaching according to the invention is based on the hitherto unreported discovery that oleophilic liquid phases based on monocarboxylic and/or polycarboxylic acid esters, carbonic acid esters, fatty alcohols and their derivatives and also ethers—and in particular based on selected mixtures of the classes of compounds mentioned—meet the requirements stated at the beginning in the acknowledgement of the prior art better than the hitherto used organic liquid phases based on pure hydrocarbon compounds. The organic liquid phases selected in accordance with the invention are distinguished on the one hand by sufficiently large molecule constituents with a hydrocarbon structure. This guarantees the element of the oleophilic organic liquid phase. However, they are distinguished from the pure hydrocarbon compounds of the prior art by their contents of functional groups of increased polarity, more particularly ester groups, ether groups and/or hydroxyl groups. Correspondingly functionalized hydrocarbon oils are distinguished not only by substantially better environmental compatibility and hence in particular by improved degradability through natural degradation processes, it has also been found that the concentrated mixtures of the oil phases selected in accordance with the invention with the dry fine-particle useful materials based on guar or guar derivatives show greatly increased stability to unwanted separation processes. By mixing selected components of the oil phase, the liquid/solid concentrates described herein can be optimized in various ways. The particular functional groups in the hydrocarbon molecule of the liquid phase would appear to perform various functions in this regard. Thus, the interaction between the surface of the guar-based solid particle and the oil phase derivatized in accordance with the invention would appear to be stronger than is the case where pure hydrocarbon oils are used. The result is the increased stability of the high concentrated mixture of useful materials to separation. However, improvements in effect can also be utilized in practice in addition to and irrespective of the aspect of increased ecological compatibility.

Before the particular characteristics of the individual classes of compounds listed above for the oleophilic liquid phase as defined in accordance with the invention are discussed, preferred generally valid parameters for these liquid phases will be defined. Accordingly, it is preferred in accordance with the invention to use oleophilic liquid phases with flashpoints of at least 100° C. and, more particularly, at least 130° C. Distinctly higher flashpoints, for example of at least 150 to 180° C., can be particularly preferred. At the same time, equally valid, preferred parameters for the viscosity behavior of the oleophilic liquid phases have to be taken into account. Preferred liquid phases for the purposes of the invention have viscosities, as measured at 10° C., of at most about 50 mPas, viscosities of at most and, in particular, below 30 mPas being particularly important. The adequate flowability of the oil-based combination of useful materials, even at low temperatures, is a desirable quality for the use of the guar concentrates in water-based borehole servicing fluids. In off-shore drilling for example, sea water with its low temperatures is of course used as aqueous phase in the borehole servicing step of the drilling process.

The mixtures according to the invention of oleophilic liquid phase and fine-particle guar-based useful material may be formulated with high concentrations in the same way as the hitherto used mixtures with oils based on pure hydrocarbon compounds. Thus, preferred mixing ratios of oleophilic liquid phase to fine-particle solid phase are mixing ratios (parts by weight) of 65:35 to 40:60, more particularly, 55:45 to 45:55. Corresponding mixtures containing substantially equal quantities by weight of guar or guar derivative on the one hand and the oleophilic liquid phase sufficiently flowable at low temperatures on the other hand are particularly suitable. Mixtures of this type are distinguished by high stability to unwanted separation, as shown in the following Examples.

A particularly relevant parameter in the choice of particularly suitable oil phases for the purposes of the invention is the pour point or softening point of the oleophilic oil or mixed oil phase. Preferred components are those which, as such or in the form of mixtures with one another, have pour points of –5° C. or lower and, preferably, of –10° C. to –15° C. or lower.

Accordingly, the oleophilic liquid phases now used in accordance with the invention in conjunction with the guar-based thickeners correspond to a prior art publication which relates generally to oil-based drilling fluids and which, in particular, describes the use of corresponding flowable oils as the continuous oil phase of w/o invert drilling muds. Among the numerous prior art publications available in the meantime, reference is made in particular to the disclosures of applicants' following patents: EP 0 386 638 ($C_{1-5}$ monocarboxylic acid esters); EP 0 386 636 ($C_{6-11}$ monocarboxylic acid esters); EP 0 374 672 (saturated $C_{12-16}$ monocarboxylic acids esters); EP 0 374 671 (monoolefinically and/or polyolefinically unsaturated $C_{16-24}$ monocarboxylic acid esters); EP 0 382 071 (methyl esters of $C_{6-24}$ monocarboxylic acids); EP 0 391 251 (water-insoluble ethers of monohydric alcohols of natural and/or synthetic origin containing at least 4 carbon atoms in the alcohol radicals); EP 0 391 252 (at least substantially water-insoluble monohydric and/or polyhydric alcohols of natural and/or synthetic origin which are flowable and pumpable at temperatures of 0 to 5° C.); EP 0 532 570 (oleophilic diesters of carbonic acid with the same or different oil-soluble monohydric and optionally polyhydric alcohols); WO 91/19771 (oleophilic polycarboxylic acid esters). The following further observations apply in particular to the disclosures of these publications on characteristic representatives of the oleophilic liquid phase defined in accordance with the invention:

The ethers to be used in accordance with the invention include corresponding oleophilic acetals of the type described, for example, in EP 0 512 501. The alcohols, the carboxylic acids or esters formed therefrom, the ethers including the acetals and other components of the classes of suitable compounds mentioned here may be at least partly of natural and/or of synthetic origin. Reference is made purely by way of example in this regard to the disclosure of WO 95/15364 which describes esters based on monocarboxylic acids and monohydric alcohols from the oxosynthesis.

The many prior art publications listed in the foregoing on the character of suitable oleophilic liquid phases are also relevant to the problem addressed by the present invention and the technical solution provided by the invention. Reference is made in this regard to the disclosures of these prior art publications in connection with the various classes of oleophilic liquid phases suitable for the purposes of the invention and mixtures thereof with guar and guar derivatives. These disclosures are hereby specifically included as part of the disclosure of the present invention.

Other particularly suitable oil phases for the purposes of the invention are esters of monocarboxylic acids which are liquid at low temperatures, more particularly corresponding esters of monocarboxylic acids containing at least 6 to 8 carbon atoms and preferably at least 10 to 12 carbon atoms. Suitable alcohols are both monohydric and lower polyhydric alcohols, for example dihydric or trihydric alcohols, as stated in detail in the cited publications.

Particular significance is attributed in this connection on the one hand to esters of saturated monocarboxylic acids containing 6 to 16 carbon atoms and/or esters of monoolefinically and/or polyolefinically unsaturated monocarboxylic acids containing 16 to 30 carbon atoms. Corresponding esters with monohydric alcohols preferably containing up to 12 carbon atoms are a particularly preferred class of compounds. Investigations conducted by applicants have shown that ester oils and, in particular, the ester oils defined therein have a particularly pronounced stabilizing effect in the highly concentrated guar mixtures. The interaction between the ester group on the one hand and the highly hydrophilic outer surface of the guar-based solid particle on the other hand would appear to be particularly intensive.

Ester oils of the type in question may be further developed and improved in a predetermined manner by mixing with other components of the classes of compounds mentioned. Basically, this principle applies to all compounds or classes of compounds corresponding to the definition according to the invention. Mixtures of esters and ethers have proved to be particularly interesting for optimizing oleophilic liquid phases in accordance with the invention. Mixed oil phases which contain the ester oils as a major component and the ether oils as a minor component are preferred. Thus, at least two thirds of the oil phase may advantageously be formed by an ester oil. Mixing ratios of ether to ester of 3:1 to 5:1 and, more particularly, of the order of 4:1, for example, have proved to be extremely effective and optimal in many respects.

Monocarboxylic acid ester oils particularly suitable in this very connection are also described in the above-cited EP 0 386 636, EP 0 374 672 and EP 0 374 671. Particularly suitable ethers are the subject of EP 0 391 251. To complete the disclosure of the present invention, certain determining elements of these particularly suitable ethers are summarized briefly in the following:

Water-insoluble ethers of monohydric alcohols of natural and/or synthetic origin containing at least 4 carbon atoms and preferably at least 6 carbon atoms in the alcohol radicals, which have flashpoints above 80° C., are particularly suitable. The ethers should be flowable and pumpable at temperatures of 0 to 5° C. and should have a Brookfield RVT viscosity at temperatures in this range of, in particular, below 50 mPas and, more particularly, at most about 30 mPas. Corresponding ethers of certain selected alcohols, more especially monohydric alcohols, are as suitable for use as the ether phase as mixed ethers and/or ether mixtures of alcohols, more especially monohydric alcohols, containing up to 24 carbon atoms which may even be at least partly olefinically unsaturated. Ethers, mixed ethers and/or ether mixtures of alcohols containing 8 to 18 carbon atoms, which may be linear and/or branched, are particularly suitable components.

As mentioned above, however, other suitable oleophilic liquid phases in the context of the teaching according to the invention—or rather mixture components for this liquid phase—are oleophilic alcohols, more particularly the oleophilic alcohols according to EP 0 391 252. These oleophilic components may be used as such and/or in the form of their at least substantially water-insoluble oligoalkoxide compounds. The monohydric and/or polyhydric alcohols preferably flowable and pumpable at temperatures of 0 to 5° C. may be of natural and/or synthetic origin. Particularly suitable are monohydric and/or dihydric oleophilic alcohols and/or corresponding partial ethers of polyhydric, more especially dihydric, alcohols which are preferably free from aromatic molecule constituents and which are derived in particular from linear and/or branched hydrocarbon chains which may also be olefinically unsaturated. Monohydric alcohols containing at least 6 to 8 carbon atoms which, if desired, may also be at least partly olefinically unsaturated and may contain up to 36 carbon atoms are characteristic representatives.

In one modification of the teaching according to the invention, the oleophilic oils defined in accordance with the invention may also be mixed with pure hydrocarbon oils, more particularly of the type used hitherto. In this case, however, the oil phase is preferably formed at least predominantly by one or more of the oils defined in accordance with the invention.

The known disclosures of the prior art apply to the other components of the guar-based multicomponent mixtures defined in accordance with the invention. Thus, reference is made to the literature reference cited at the beginning, Davidson, chapter 6, in connection with the character of the guar-based solid. Suitable guar derivatives are, in particular, corresponding compounds which have been formed by etherification or esterification of hydroxyl groups on the guar molecule. Commercial important derivatives are, in particular, hydroxyalkylated compounds, such as hydroxyethyl and/or hydroxypropyl guar, and carboxymethylated derivatives obtained, for example, by reaction of the starting material with monochloroacetic acid. The interaction between hydrated minerals and the guar derivative may be influenced in known manner, for example by hydroxyalkylation. Electrolyte compatibility is also distinctly improved by hydroxyalkylation of the guar. The same applies to the solubility and clarity of the aqueous guar solutions.

Information on the use of crosslinking reactants (crosslinkers) can also be found in the relevant prior art publications cited at the beginning. In this respect, the oleophilic liquid phases selected in accordance with the invention do not entail any basic departures from relevant technical knowledge. This applies in particular to all the liquid oils defined in accordance with the invention which contain polar, but non-reactive groups incorporated in the hydrocarbon molecule, i.e. for example to the corresponding ethers and esters.

Potentially interesting liquid oil components which may be used together with the oleophilic oil phases defined in accordance with the invention are the so-called linear α-olefins (LAO) and/or the corresponding poly-α-olefins (PAO). The teaching according to the invention encompasses the use of such components. Preferred representatives of these olefins correspond in their physical parameters to the values mentioned above for oil phases suitable for the purposes of the invention. The relevant literature is represented, for example, by EP 0 627 481.

The following Examples initially describe stability tests on highly concentrated guar preparations in the oil phases defined in accordance with the invention. In the following Comparison Examples, water-based borehole servicing fluids are prepared using the mixtures defined in accordance with the invention and are compared in their dissolving and viscosity behavior with a comparable conventional mixture based on a pure hydrocarbon oil mixed with quar.

EXAMPLES

If, in the following Examples, the particular oleophilic liquid phases used are not defined by their chemical name, but instead by another name, the following definitions apply for the purpose of identification of the particular liquid phase:

"PETROFREE", a commercial product of Henkel KGaA: an ester mixture of substantially saturated fatty acids based on palm kernel oil and 2-ethyl hexanol which consists by far predominantly of $C_{12-14}$ fatty acids.

Commercial product "Pernil RU": a polyolefinically unsaturated $C_{18}$ fatty alcohol (iodine value >60).

Commercial product "Lorol C8–10": $C_{8-10}$ fatty alcohol.

Commercial product "BP 83HF": pure hydrocarbon oil used in the prior art.

Example 1

In a number of tests, various carrier liquids are used to prepare slurries in conjunction with two different types of guar flour. The guar flour marketed as "KWL 2000", which does not contain any viscosity-stabilizing additives, is used in the first series of tests. A viscosity-stabilized guar flour marketed as "J4PL" by the Western Co., Aberdeen, GB, is used in a second series of tests.

To determine the stability of the particular guar flour/carrier liquid mixture, a slurry is prepared as follows in every case: 100 ml of carrier liquid and 85 g of guar flour (quantity ratio 1:1) are mixed together. To this end, the guar flour is introduced into the stirred carrier liquid (stirring time 25 minutes; IKA stirrer rotating at 500 r.p.m.). The slurry is then introduced into a 250 ml measuring cylinder and heated in a water bath for 24 hours at 27° C. Thereafter, the phase separation occurring is read off from the graduation of the measuring cylinder and correspondingly converted.

The following results are obtained with different carrier liquids—using the pure hydrocarbon oil "BP 83HF" in accordance with the prior art on the one hand and oleophilic oil phases according to the invention on the other hand:

| Liquid Phase | % Liquid Phase Removed After 24 Hours |
| --- | --- |
| BP 83HF | 40 |
| Di-n-octyl ether | 25 |
| Rapeseed oil, refined | <5 |
| Petrofree | 5 |
| 2-Ethylhexyl oleate | 5 |

If the stabilized guar flour "J4PL" is subjected to the same procedure, the following results are obtained:

| Liquid phase | ml Slurry | % Liquid Phase Removed After 24 Hours |
| --- | --- | --- |
| BP 83HF | 154 | 10 |
| Petrofree | 154 | 3 |
| Di-n-octyl ether | 154 | 3 |
| Rapeseed oil, refined | 152 | 0 |
| Petrofree/Pernil RU 1:1 | 150 | 1 |
| $C_{16}$ Guerbet alcohol/Petrofree 1:1 | 150 | 1 |
| 2-Ethylhexyl carbonate | 150 | 3 |
| Dioctyl adipate | 148 | 3 |
| Diethylhexyl sebacate | 148 | 1 |
| Petrofree/Pernil RU 4:1 | 148 | 1 |
| Petrofree/rapeseed oil, ref. 3:2 | 154 | 3 |
| Petrofree/di-n-octyl ether 4:1 | 154 | 3 |
| 2-Ethylhexyl oleate | 156 | 1 |
| Isobutyl oleate | 152 | 1 |
| Lorol $C_{8-10}$ + 3 PO | 164 | 4 |
| Lorol $C_{8-10}$ + 1 EO + 2 PO | 154 | 3 |

For all the systems defined in accordance with the invention, the comparison tests demonstrate the reduced separation of the solid phase in the oil phase, even after storage for 24 hours.

Example 2

In a series of further comparison tests under standard conditions, the dissolving behavior and viscosity development of multicomponent mixtures based on guar flour formulated in accordance with the invention are determined and compared with those of a corresponding product belonging to the prior art in which the guar flour is dispersed in the pure hydrocarbon oil phase.

The following test formulation adapted to the composition of typical frac fluids is used in every case:

Test formulation:
  500 ml water
  10 g KCl (electrolyte)
  1 ml pH buffer (NaOH, pH 11–12)
  2.4 g guar powder, corresponding to 5.8 g of the particular dispersion 0.75 ml borate-based crosslinker.

The particular test formulation is rheologically tested as follows: the particular shear force is determined by Fann measurement at 120° F. (49° C.) and with permanent shearing at 300 r.p.m. This measurement is carried out at intervals of 1 minute over a total period of 10 minutes. The results shown in the following Table are the SKT values of the Fann measurement corresponding to the figures in cP as the unit of measure.

Table 4 below shows the test data of four multicomponent mixtures corresponding to the invention and compares them with the corresponding prior art material based on the pure hydrocarbon oil phase.

| Fann Data (cP) | Carrier Liquids Used for the Dispersion: | | | | |
| --- | --- | --- | --- | --- | --- |
| | Petrofree | Di-n-octyl-ether | Petrofree/ Di-n-octyl-ether 4:1 | Petrofree/ Pernil RU 1:1 | BP 83HF Normal Oil |
| After preparation | 27 | 29 | 29 | 28 | 28 |
| After 1 minute | 25 | 26 | 25 | 25 | 25 |
| After 2 minutes | 25 | 26 | 24 | 25 | 24 |
| After 3 minutes | 24 | 26 | 24 | 25 | 23 |
| After 4 minutes | 24 | 29 | 26 | 29 | 26 |
| After 5 minutes | 25 | 50 | 33 | 46 | 37 |
| After 6 minutes | 55 | 135 | 76 | 90 | 88 |
| After 7 minutes | 98 | 172 | 115 | 141 | 158 |
| After 8 minutes | 124 | 205 | 156 | 165 | 185 |
| After 9 minutes | 113 | 235 | 192 | 158 | 176 |
| After 10 minutes | 104 | 228 | 176 | 140 | 160 |

What is claimed is:

1. A method of controlling the viscosity of a water-based borehole servicing fluid comprising adding to said fluid a storage-stable homogenous mixture of a liquid phase and a solid phase, said liquid phase comprising an oleophilic organic oil selected from the group consisting of monocarboxylic acid esters, polycarboxylic acid esters, carbonic acid esters, ethers, fatty alcohols, oligoalkoxides of fatty alcohols, and mixtures thereof, wherein said liquid phase is flowable at temperatures of 0 to 10° C., has a flashpoint of at least 80° C., and has a viscosity of not more than 150 mPas at 10° C., and said solid phase comprising guar, a water-soluble guar derivative, or a mixture thereof wherein the weight ratio of the liquid phase to the solid phase is 65:35 to 40:60.

2. A method according to claim 1, wherein the weight ratio of the liquid phase to the solid phase is 55:45 to 45:55.

3. A method according to claim 1, wherein the liquid phase flash point is at least 100° C. and the liquid phase viscosity is not more than 50 mPas.

4. A method according to claim 3, wherein the liquid phase flash point is at least 130° C. and the liquid phase viscosity is not more than 30 mPas.

5. A method according to claim 1, wherein the oil is an ester derived from a $C_8$ or higher monocarboxylic acid and a monohydric or lower polyhydric alcohol.

6. A method according to claim 5, wherein the monocarboxylic acid is $C_{10}$ to $C_{12}$.

7. A method according to claim 1, wherein the oil has a pour point of less than −5° C.

8. A method according to claim 7, wherein the oil has a pour point of −10° C. to −15° C.

9. A method according to claim 1, wherein the oil is an ester derived from a carboxylic acid selected from the group consisting of $C_6$ to $C_{16}$ saturated monocarboxylic acids and $C_{16}$ to $C_{30}$ mono- or polyolefinically unsaturated monocarboxylic acids.

10. A method according to claim 9, wherein the carboxylic acid forms an ester with a monohydric alcohol.

11. A method according to claim 1, wherein the liquid phase comprises a monocarboxylic acid ester and an oleophilic ether.

12. A method according to claim 11, wherein the viscosity of the ether is less than the viscosity of the ester.

13. A method according to claim 1, wherein the ether is derived from a $C_1$ to $C_{24}$ saturated or unsaturated monohydric alcohol.

14. A method according to claim 1, wherein the ether is derived from a $C_8$ to $C_{18}$ linear or branched monohydric alcohol.

15. A method of controlling the viscosity of a water-based borehole servicing fluid comprising adding to said fluid a storage-stable homogenous mixture of a solid phase and a liquid phase, said solid phase comprising guar, a water-soluble guar derivative, or a mixture thereof, and said liquid phase comprising an ester derived from an acid selected from the group consisting of $C_8$ and higher monocarboxylic acids, $C_6$ to $C_{16}$ saturated monocarboxylic acids, and $C_{16}$ to $C_{30}$ mono- or polyolefinically unsaturated monocarboxylic acids and an ether derived from a $C_1$ to $C_{24}$ saturated or unsaturated monohydric alcohol or a $C_8$ to $C_{18}$ linear or branched monohydric alcohol wherein the weight ratio of the liquid phase to the solid phase is 65:35 to 40:60.

16. A method according to claim 15, wherein the weight ratio of ester to ether is 3:1 to 5:1.

* * * * *